United States Patent [19]

Berrettini et al.

[11] Patent Number: 4,805,672

[45] Date of Patent: Feb. 21, 1989

[54] AUTOMATIC PRECISION LIQUID LOADING CONTROL METHOD

[75] Inventors: Bruce J. Berrettini, Allentown; Donald P. Bucci, Mertztown; Roy D. Hollopeter, Coopersburg, all of Pa.

[73] Assignee: Air Products and Chemicals, Inc., Allentown, Pa.

[21] Appl. No.: 929,966

[22] Filed: Nov. 12, 1986

Related U.S. Application Data

[62] Division of Ser. No. 690,233, Jan. 10, 1985, Pat. No. 4,649,968.

[51] Int. Cl.$^4$ .............................................. B65B 3/10
[52] U.S. Cl. .......................................... 141/5; 141/95; 141/197
[58] Field of Search ................ 73/301; 141/5, 95, 197, 141/198, 226

[56] References Cited

U.S. PATENT DOCUMENTS

| | | | |
|---|---|---|---|
| 2,548,960 | 4/1951 | Ekstrom | 73/301 |
| 3,494,387 | 2/1970 | Gillies et al. | 141/40 |
| 3,618,643 | 11/1971 | Thomson et al. | 141/198 |
| 3,916,961 | 11/1975 | Dilger | 141/46 |
| 3,983,913 | 10/1976 | Bower | 141/95 |
| 4,082,122 | 4/1978 | McGahey | 141/5 |
| 4,266,580 | 5/1981 | Dixon | 141/35 |
| 4,483,376 | 11/1984 | Bresie et al. | 141/95 |
| 4,649,968 | 3/1987 | Berrettini et al. | 141/5 X |

*Primary Examiner*—Werner H. Schroeder
*Attorney, Agent, or Firm*—Thomas G. Ryder; James C. Simmons

[57] ABSTRACT

A fixed fluid control system for loading fluids into sealed tanks includes pressure sensing conduits in a mobile vehicle and fixed fluid controls. In the vehicle are first and second pressure sensing conduits having portions within the sealed tank positioned at the top and bottom of the tank. The pressure sensing conduits have exterior portions to which are detachably coupled additional pressure sense lines. The additional pressure sensing conduits are coupled to a differential pressure to current converter within the fixed fluid control system. The converter produces a current signal proportional to the pressure difference between the two sense lines. When this current reaches a predetermined high level, the supply of fluid to the sealed tank is discontinued.

4 Claims, 3 Drawing Sheets

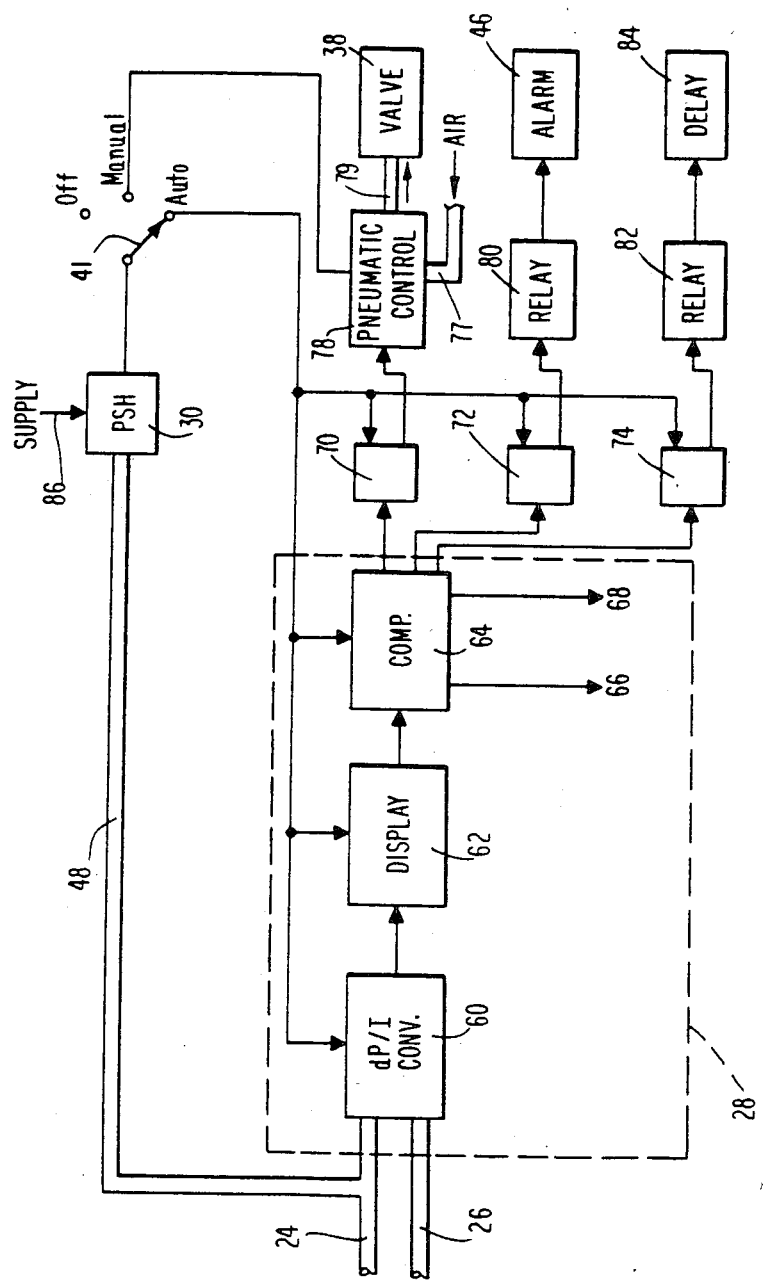

AUTOMATIC PRECISION LIQUID LOADING CONTROL METHOD

This is a division of application Ser. No. 690,233, filed Jan. 10, 1985, now U.S. Pat. No. 4,649,968.

BACKGROUND OF THE INVENTION

A. Field of the Invention

This invention relates to the field of loading fluid into trailers and in particular to control of such loading from a fixed control system.

B. Background Art

When loading volatile liquids, such as cryogenic liquids, into sealed tanks inside trailers, it is difficult to assure safety and accuracy. Conventionally, a differential pressure meter is provided at the rear of the trailer. This meter was used to obtain an indication of the level of the liquid within the tank. However, trailer-mounted analog liquid gauges are inherently inaccurate, having an accuracy of only plus or minus one percent when new. Furthermore, because this differential pressure meter is permanently attached to the trailer, it is subject to a great deal of vibration and other abuse which causes the accuracy to deteriorate to plus or minus five percent or worse after a period of use.

With respect to safety, it was required that the person filling the trailer be present where the differential pressure meter is mounted at the rear of the trailer in order to observe the meter. This location is in proximity to the coupling between the flexible filling hose and the intake connection. Thus, any accidental spilling of the liquid, blow-off of excess pressure, or other type of accident exposed this person to danger, particularly if the fluid or its vapors were toxic. In order to control filling manual opening and closing of a valve in the supply pipe has been required. This resulted in inaccuracy because manual closing of the valves could take as long as three to five minutes.

The vibration due to driving and road dust and dirt causes linkages within the differential pressure gauge to stick. Additionally, the environment within the rear of the truck where the differential pressure gauge is mounted is very severe. If the liquid stored in the tank is a cryogenic liquid, the rear is cold and foggy. These conditions combine to cause the accuracy of truck-mounted differential pressure gauges to decline to ±5% or worse.

A more accurate method of controlling level has been in the use of a direct acting weight scale. However, it does not eliminate the danger to the operator and it is very costly to retrofit a facility with scales.

U.S. Pat. No. 4,266,580 shows a system for loading tank cars. U.S. Pat. No. 3,618,643 (Hovant) teaches a loading bay for filling the compartments of a vehicle with liquid fuel. However, neither of these patents are considered suitable or readily adaptable for use in loading cryogenic liquids into sealed tanks because they include inserting an apparatus into the tanks being loaded.

For purposes of considering the patentability of the invention disclosed and claimed herein, a brief patentability search has been conducted. In addition to the patents mentioned above, other patents identified to be of possible interest in this search were:

| | |
|---|---|
| 3,494,387 | Gillies et al |
| 3,916,961 | Dilger |
| 3,983,913 | Bower |
| 4,082,122 | McGahey |

However, none of the devices taught by the foregoing patents appears adaptable to automatic precision liquid loading of cryogenic liquids.

It is an object of the present invention to provide a system for filling sealed tanks with fluid wherrein the level of fluid may be controlled with precision.

It is an additional object of the present invention to provide a system for filling sealed tanks in trailers in which operator control functions are performed remotely from the trailer to assure operator safety.

SUMMARY OF THE INVENTION

A fixed fluid control system for loading fluids into sealed tanks includes pressure sensing conduits in a mobile vehicle and fixed fluid controls. In the vehicle are first and second pressure sensing conduits having portions within the sealed tank positioned at the top and bottom of the tank. The pressure sensing conduits have exterior portions to which are detachably coupled additional pressure sense lines. The additional pressure sensing conduits are coupled to a differential pressure to current converter within the fixed fluid control system. The converter produces a current signal proportional to the pressure difference between the two sense lines. When this current reaches a predetermined high level, the supply of fluid to the sealed tank is discontinued.

BRIEF DESCRIPTION OF THE INVENTION

FIG. 3 shows a block diagram of the fixed portions of the system of FIG. 1.

DETAILED DESCRIPTION OF THE INVENTION

Figure 1:
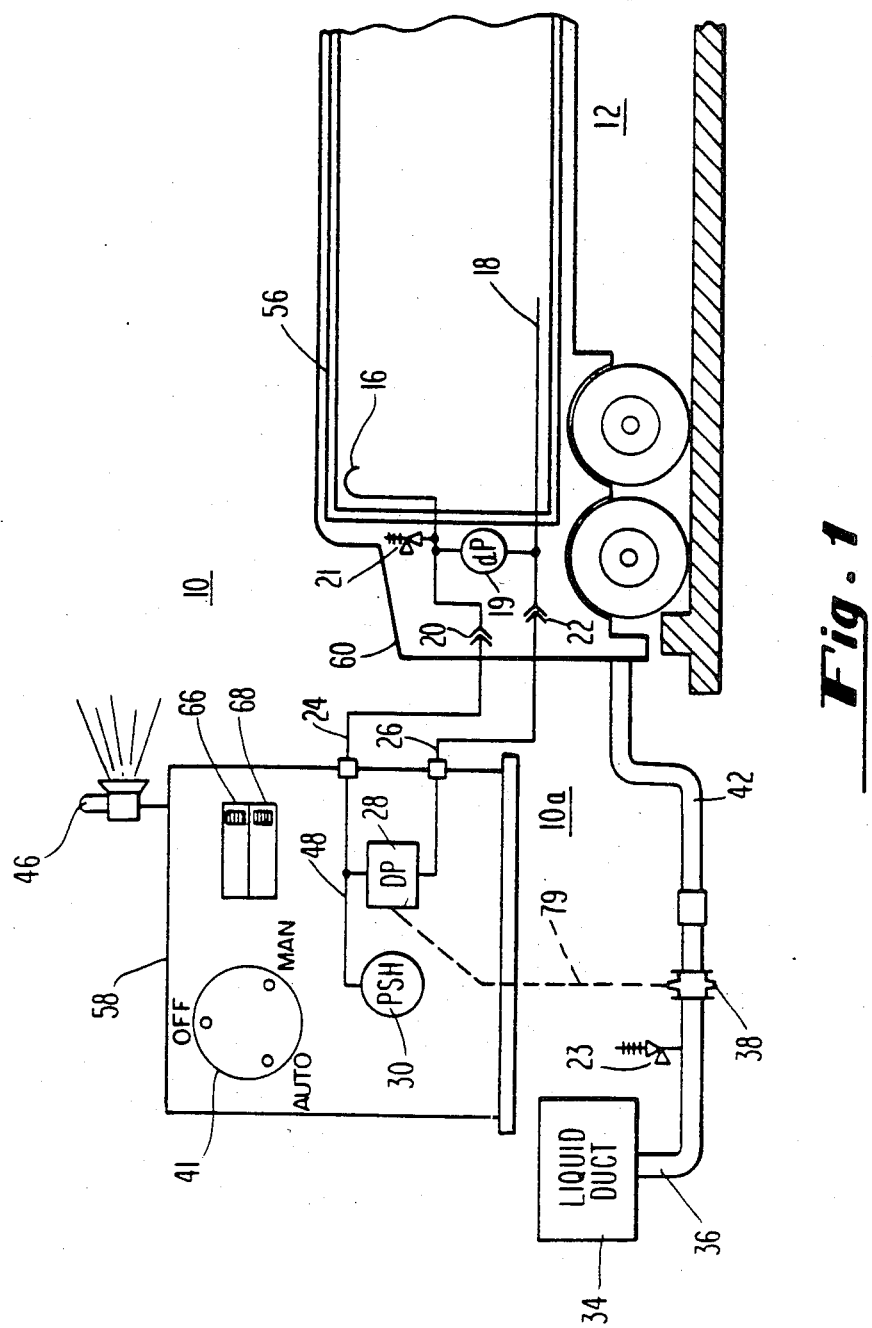
FIG. 1 shows in block and diagrammatic form the automatic precision liquid loading control system of the present invention.

FIG. 1 shows the automatic precision liquid loading control system 10 including mobile vehicle 12, and a fixed station 10a comprising a controller 58, liquid duct 34, valve 38 and supply hose 42. Vehicle 12 is a conventional truck or trailer and includes a sealed tank 56 and a rear compartment 60. While sealed tank 56 may be used to transport any liquid, it preferably contains a cryogenic liquid. Within sealed tank 56 are pressure sense conduits or lines 16 and 18. Pressure conduit 16 is positioned near the top of tank 56 to detect the pressure of the vapor space above the liquid which may be stored in tank 56. Pressure sense conduit 18 is positioned near the bottom of tank 56 in order to sense the pressure at the bottom of tank 56. The pressure at the bottom of tank 56 is the sum of the vapor space pressure sensed by conduit 16 and the pressure caused by the level of liquid stored in tank 56. Thus, the difference between the pressure sensed by conduits 16 and 18 is related to the level of liquid within tank 56.

Within rear compartment 60, conventional differential pressure meter 19 determines the difference between these two pressures. Differential pressure meter 19 is coupled between pressure sense conduits 16 and 18 and produces a reading proportional to the difference between the pressures in conduits 16 and 18, which is proportional to the height of liquid within tank 56. A thermal valve 21 is provided on pipe 16 to release excessive pressure as a safety measure. To provide insulation, tank 56 has two layers, and the space between the layers is evacuated.

Also within compartment 60 are connectors 20, 22 which are fixedly coupled to pressure sensing lines 16, 18 respectively. Connectors 20, 22 are detachably coupled to pressure sense lines 24 and 26 respectively, thereby allowing pressure sense lines 24, 26 to be detachably coupled to pressure sense conduits 16, 18. Thus, the pressure in line 24 is substantially equal to the pressure sensed by conduit 16 within tank 56 and the pressure within line 26 is substantially equal to the pressure sensed by conduit 18 within tank 56.

Lines 24, 26 are also coupled to fixed controller 58, thereby applying to controller 58 the pressures sensed by conduits 16, 18. If trailer 12 contains a volatile or toxic substance which must be kept at a safe distance from controller 58, lines 24, 26 may contain a diaphragm and an incompressible fluid to couple the pressure of tank 56 to controller 58.

Liquid duct 34 is an insulated enclosure which carries liquid to the site where truck 12 is loaded. Liquid is carried from liquid duct 34 through liquid supply pipe 36 and flexible supply hose 42. Supply pipe 36 is provided with a thermal valve 23 for safety. In conventional manner, supply hose 42 is coupled to truck 12 in order to supply liquid from liquid duct 34 to tank 56 within truck 12. Liquid supply pipe 36 includes a pneumatically controlled valve 38.

Within controller 58, pressure sense lines 24, 26 are coupled to differential pressure monitor 28. Differential pressure monitor 28 produces a signal proportional to the difference between the pressure in pressure sense lines 24, 26. This difference is related to the difference between the pressure at the top and bottom of tank 56 and is, therefore, proportional to the level of liquid within tank 56.

When the differential pressure reaches a predetermined set point, a pneumatic signal is applied through a pneumatic line 79 which controls valve 38 to close pipe 36. Thus, a predetermined precise level of liquid within tank 56 may be obtained without operator intervention. Controller 58 includes a three position selector switch 41 which permits selection of the foregoing automatic mode of filling or manual filling, or shutdown of controller 58. When manual filling is selected valve 38 is opened and none of the functions of controller 58 are performed.

Figure 2:
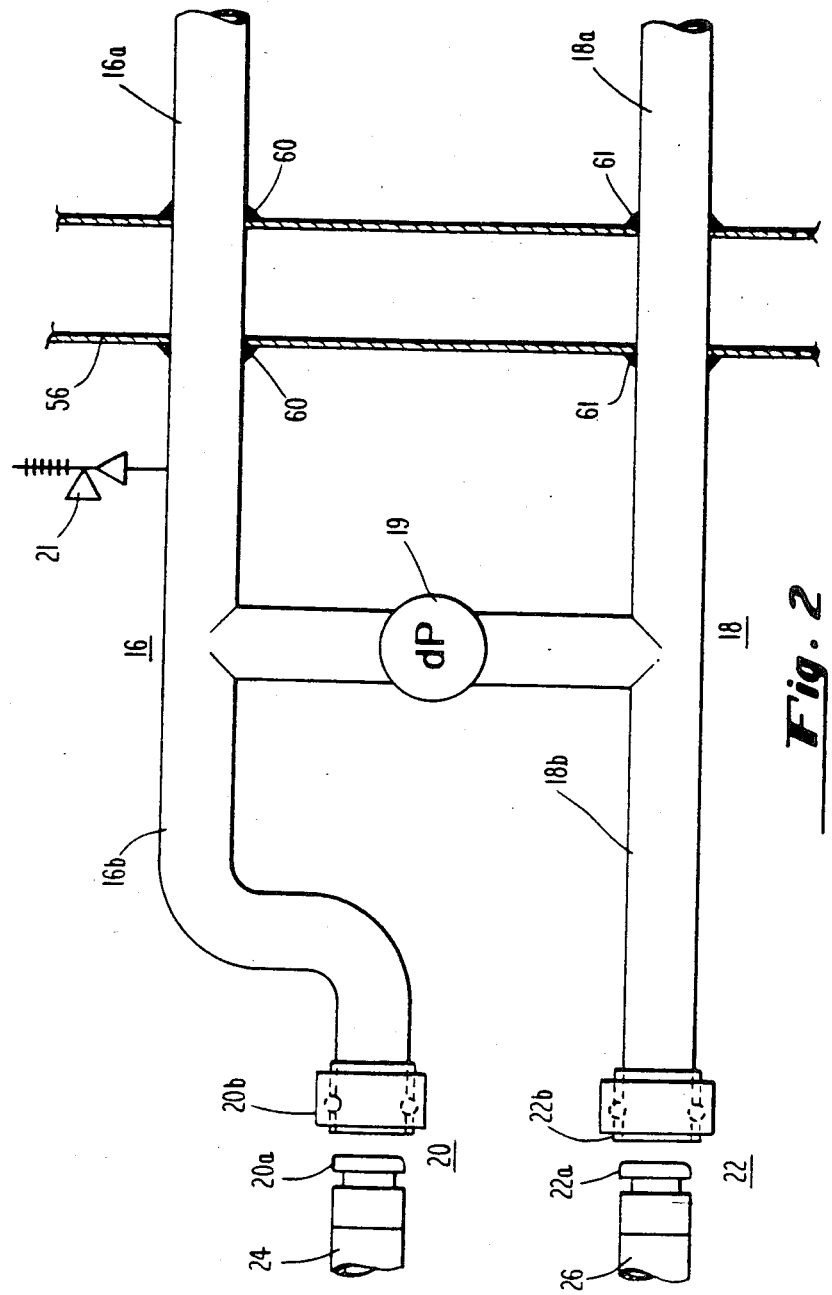
FIG. 2 is an expanded view of a portion of the permanent pressure conduits id FIG. 1.

In FIG. 2, pressure conduit 16 is shown having a section 16a within tank 56 and a section 16b exterior to tank 56. Because sealed tank 56 must withstand the vapor pressure caused by storing a cryogenic liquid, welds 60, completely surrounding sense pipe 16, are performed to completely and permanently seal the hole in each layer of tank 56 through which pipe 16 passes. Similarly, welds 61 completely seal the hole in each layer of tank 56 through which pipe 18 passes at the junction of interior portion 18a and exterior portion 18b.

The exterior sections 16b, 18b are at the same pressure as interior sections 16a, 18a, respectively. The exterior sections 16b, 18b are coupled to differential pressure gauge 20.

Conduits 16b and 18b are coupled to connectors 20, 22, respectively. Connectors 20, 22 are conventional connectors, each having two connector portions which may be coupled to each other. Connector portion 20a is secured to line 24 and portion 20b is secured to conduit 16b. Similarly, connector 22 has portions 22a,b secured to lines 26, 18b, respectively.

In conventional manner, coupling is accomplished by sliding back a spring loaded sleeve on section 20b or 22b, inserting section 20a or 22a, and releasing the sleeve. Alternatively, one of the sections 20a, 22a may be secured to a conduit 16, 18 and the corresponding section 20b, 22b may be secured to a line 24, 26. If one of the connectors 20, 22 is reversed in this manner, it is impossible to couple lines 24, 26 to the incorrect conduits 16, 18.

In FIG. 3, pressure sense lines 24, 26 are coupled to differential pressure to current converter 60 of monitor 28. Monitor 28 also comprises a display 62 and a comparator 64. In conventional manner, converter 60 converts the difference betwen the pressures of pressure sense lines 24, 26 into a current signal. The magnitude of the output current signal from converter 60 may vary, for example, from 4–20 milliamps as the differential pressure varies from zero to maximum inches of water or pressure.

The output current signal of converter 60 is applied to display 62. Display 62, preferably LED, displays a pressure reading between zero and the maximum inches of pressure depending on the magnitude of the current signal applied by converter 60. Additionally, display 62 applies the current signal from converter 60, without alteration, to comparator 64.

Comparator 64 compares the current signal with two predetermined set points. One set point is selected to represent a ninety percent full condition for a tank 56 of trailer 12 being filled. The second predetermined set point is selected to represent a one hundred percent full level. Thumbwheel switch set point selectors 66, 68, as shown in FIG. 1, are coupled to comparator 64 and permit the manual selection of these two set points as appropriate for a particular trailer 12 before filling begins.

When comparator 64 determines that the current signal produced by differential pressure to current converter 60 is substantially equal to the selected level representative of tank 56 being ninety percent full, comparator 64 applies a DC signal to a solid state photo-isolator relay 74. This causes photo-isolator 74 to supply energy from supply line 86 to relay 82. When relay 82 is energized, a delay 84 is initiated and an alarm 46 is activated. When a predetermined period of delay time has passed, delay 84 deactivates alarm 46. Thus a temporary warning alarm is provided when trailer 12 reaches the ninety percent level.

Photo-isolator relay 74 is effective to isolate the sensitive circuitry of comparator 64 from the large transients which occur when current is switched to relay 82 from supply line 86. Additionally, other relays, such as relay 80, are isolated from these transients when relay 82 is energized thereby preventing the energizing of relay 82 from causing other relays to be improperly energized.

When comparator 64 determines that the signal produced by converter 60 is representative of the one hundred percent full level of trailer 12, comparator 64 applies signals to photo-isolated relays 70, 72. When comparator 64 applies the one hundred percent full signal to photo-isolator 72, it causes energy from supply line 86 to be applied to relay 80, thus actuating relay 80 which activates alarm 46. Thus, an alarm signal is provided to warn the operator that trailer 12 is one hundred percent full and alarm 46 must be manually deactivated.

Photo-isolated relay 70 supplies energy from energy source 86 to pneumatic control 78 during filling of tank 56, thereby causing normally closed valve 38 to remain open. However, when photo-isolator 70 receives the one hundred percent full signal from comparator 64, it causes energy from supply 86 to be disconnected from pneumatic control 78. When pneumatic control 78 is thus deactivated, it prevents air from passing from an air supply 77 to pneumatic control air line 79, thus causing normally closed valve 38 to close. As shown in FIG. 1, when valve 38 is closed, liquid from supply pipe 36 is prevented from passing through filling hose 42 into tank 56. Thus, when comparator 64 determines that tank 56 is one hundred percent full, comparator 64 causes the filling of tank 56 to stop by closing valve 38 and warns the operator by activating alarm 46.

All of the energy supplied from supply 86 to photo-isolated relays 70, 72, 74 must pass through high pressure auto-valve shutdown switch 30 and selector switch 41. Switch 30 is coupled to pressure sense line 24 by line 48. When shutdown switch 30 determines that the pressure in line 48 has risen above a predetermined threshold, all power to circuits 60, 62, 64, 70, 72, 74 is shut down, closing normally closed valve 38. Pressure switch 30 thus provides emergency backup protection for any overfill which may occur. One way in which such a condition may be caused is by improper set point selection.

If sector switch 41 is in the AUTO position, power is supplied to the elements of controller 58. However, if switch 41 is in the MANUAL position indicating manual operation, power is supplied from PSH 30 only to pneumatic control 78 to constantly actuate valve 38 to the open position. To close valve 38, switch 41 is turned to the OFF position.

Thus, fixed system 10a permits a mobile vehicle to be filled by backing a vehicle 12 up to system 10a, coupling pressure sense lines to conduits in the vehicle and coupling a filling hose to the vehicle. The operator then indicates set points and places the selector switch 41 into the AUTO position, thereby initiating filling. When system 10 determines that the vehicle is full and stops the flow of the liquid, the operator disconnects the sense lines and the filling hose and the vehicle may be driven away.

It is anticipated that the aspects of the present invention, other than those specifically described and illustrated will be apparent from the foregoing description and the drawings, and many other variants of the invention may be devised.

For example, a heater may be included within the housing of controller 58 to assure reliable operation at low temperatures. This heater may be a conventional thermostatically controlled electrical heating element with a fan to force air across the heating element. For adequate temperature control, the exposed inner surface of the housing of controller 58 may be covered with an insulating material such as styrofoam.

The appended claims are intended to be construed to encompass all such variants and aspects which are within the true spirit and scope of the invention.

In automatic precision loading system 10, the following components have been used for the operation and function as described and shown:

| Reference Numeral | Type |
|---|---|
| 20, 22 | Swagelok QF4, Solon, OH |
| 30 | 4NN-K45-ClA-Sl-BB-TT-X, Static O-Ring, Olise, KS |
| 60 | 1151 DP-4E-2AB-2-T02B7, Rosemont, Minneapolis, MN |
| 62 | 400A13, Doric, San Diego, CA |
| 64 | 411A-003A, Doric, San Diego, CA |
| 70, 72, 74 | W-6110DTX-1, Magnacraft |
| 78 | 8302A81F, Asco |

What is claimed is:

1. A method of loading fluid from a source controlled by a fixed station having differential pressure sensing means into a sealed tank of a mobile vehicle having first and second pressure sensing conduit means each sensing unequal substantially high pressures in the tank comprising the steps of:
   (a) supplying fluid into the sealed tank through a supply conduit separate from the first and second pressure sensing conduit means;
   (b) detachably coupling first pressure transmitting conduit means to the first pressure sensing conduit means;
   (c) applying a first pressure to the differential pressure sensing means by way of the first pressure transmitting conduit means for sensing the pressure within the first pressure sensing conduit means;
   (d) detachably coupling second pressure transmitting conduit means to the second pressure sensing conduit means;
   (e) applying a second pressure unequal to the first applied pressure to the differential pressure sensing means by way of the second pressure transmitting conduit means for sensing the pressure within the second pressure sensing conduit means;
   (f) sensing the substantially small value differential pressure between the first and second pressure sensing conduit means by the differential pressure sensing means wherein the sensed differential pressure value is substantially small relative to the pressures of the first and second pressure sensing conduit means and producing a differential pressure signal related to the substantially small value differential pressure within the tank;
   (g) producing a differential pressure set point signal when the produced differential pressure signal is beyond a predetermined set point; and
   (h) controlling the supply of fluid free of measurement within the supply conduit in response to the differential pressure set point signal.

2. The method of claim 1 in which the first and second pressure sensing conduit means respectively sense a first pressure of a vapor space above the fluid and a second pressure substantially near the bottom of the tank.

3. The method of claim 1 in which the sensing of differential pressure comprises converting from differential pressure to an electrical differential pressure signal and transmitting the electrical differential pressure signal as the produced differential pressure signal.

4. The method of claim 2 further comprising the step of determining when the pressure of a vapor space above the fluid in the tank is above a predetermined pressure set point signal and controlling the supply of fluid in response to the vapor space pressure determination.

* * * * *